United States Patent [19]
Li

[11] Patent Number: 5,339,950
[45] Date of Patent: Aug. 23, 1994

[54] COMPUTER DISK STORAGE BOX WITH A COLLAPSIBLE COPY HOLDING MEANS

[76] Inventor: Chin-Chu Li, No. 1-4, Wu Nan Road, Wu Hai Taichung, Taiwan

[21] Appl. No.: 169,241

[22] Filed: Dec. 20, 1993

[51] Int. Cl.[5] .............................................. B65D 85/30
[52] U.S. Cl. ............................ 206/45.23; 206/214; 206/449; 206/444; 220/212; 281/45
[58] Field of Search .................. 206/444, 45.15, 45.18, 206/45.2, 45.23, 214, 215, 449, 495; 220/212, 8; 281/42, 44, 45

[56] References Cited

U.S. PATENT DOCUMENTS

| | | | |
|---|---|---|---|
| 3,977,744 | 8/1976 | De Witt | 206/214 X |
| 4,892,334 | 1/1990 | Sinclair | 281/45 |
| 4,896,927 | 1/1990 | Liu et al. | 281/45 X |
| 5,244,109 | 9/1993 | Mullett et al. | 220/212 X |

*Primary Examiner*—Jacob K. Ackun, Jr.
*Attorney, Agent, or Firm*—Lowe, Price, LeBlanc & Becker

[57] ABSTRACT

A computer disk storage box includes a rectangular casing having a top opening, and a top cover assembly pivoted to the casing and retained between a closed position covered on the top opening and an opened position lifted from the top opening, the top cover assembly consisted of a top cover board, a first extension board, and a second extension board that slide one within another, stop springs and stop blocks to retain the top cover board and the extension boards in respective extended positions, and a clip on the second extension board to hold sheets of paper on the top cover assembly as the top cover assembly is extended out and lifted from the top opening of the casing.

2 Claims, 4 Drawing Sheets

COMPUTER DISK STORAGE BOX WITH A COLLAPSIBLE COPY HOLDING MEANS

BACKGROUND OF THE INVENTION

The present invention relates to computer disk storage boxes, and more particularly relates to a computer disk storage box having a collapsible copy holder formed of a top cover board and a set of extension boards.

A variety of storage boxes have been disclosed for keeping computer disks, and have appeared on the market. While doing a data input work, a computer disk storage box may be put on the desk to keep unlabeled computer disks as well as labeled computer disks having data stored in, and at the same time, a copy holder may be used to hold the copies. Therefore, much desk space is needed for the computer disk storage box and the copy holder.

SUMMARY OF THE INVENTION

The present invention has been accomplished under the aforesaid circumstances. It is therefore the principal object of the present invention to provide a computer disk storage box which can be used for keeping computer disks as well as for holding copies. It is another object of the present invention to provide a copy holder for a computer disk storage box which is collapsible and which does not need much installation space. To achieve these objects, there is provided a computer disk storage box comprised of a rectangular casing, a top cover covered on the casing, a first extension board made to slide on the top cover, and a second extension board made to slide on the first extension board. The top cover can be lifted from the casing and retained at any of a series of sloping positions. The first extension board can be extended out of the top cover and retained in the extended position by stop springs. The second extension board can be extended out of the top cover and retained in the extended positions by stop springs. A clip is made on the second extension board for holding sheets of paper. As the top cover is set in a sloping position, the first and second extension boards are retained in the respective extended positions, and therefore copies are retained to the second extension board by the clip.

DETAILED DESCRIPTION OF THE PREFERRED EMBODIMENT

Figure 1:
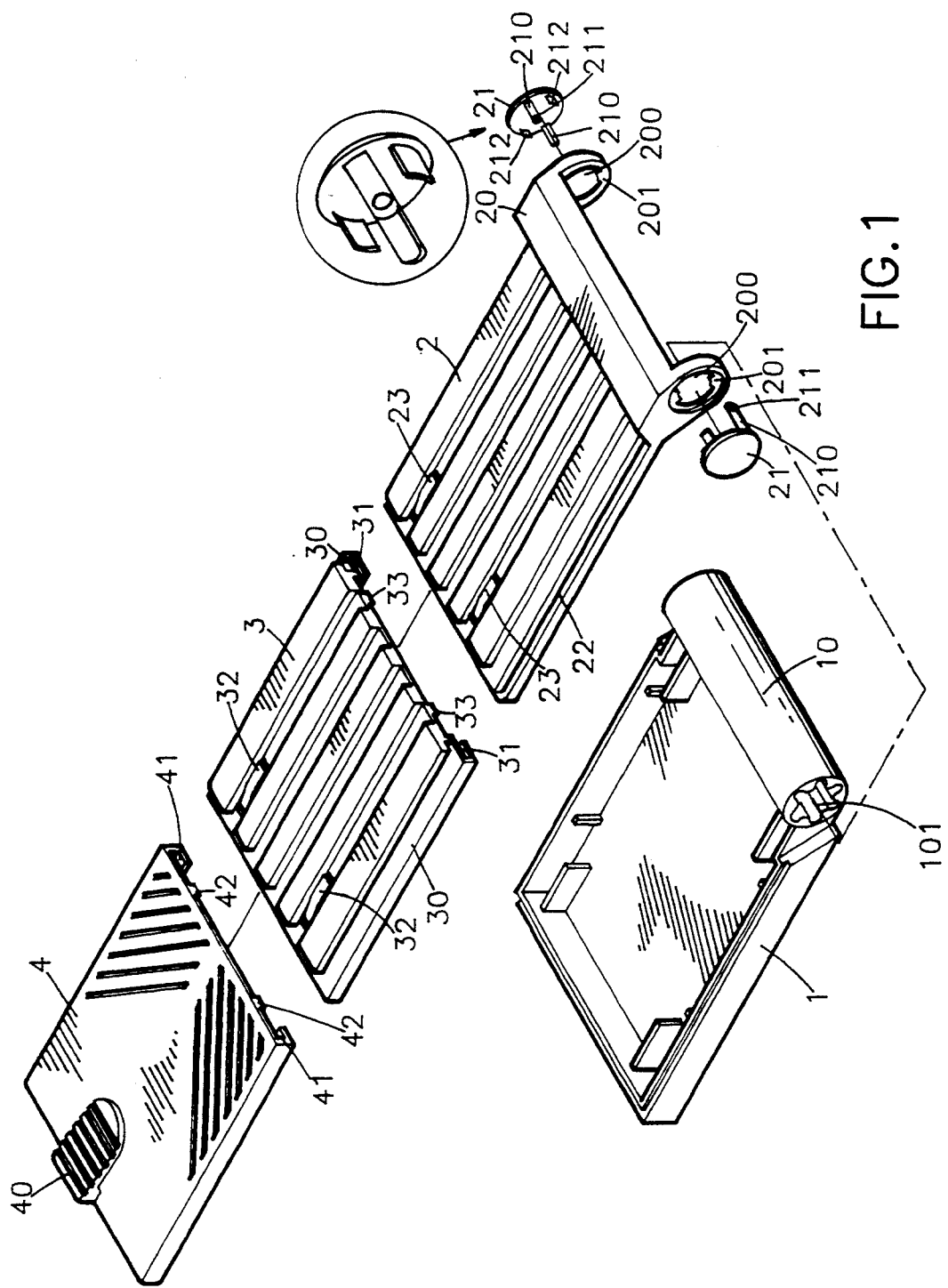
FIG. 1 is an exploded view of a computer disk storage box according to the preferred embodiment of the present invention.
Figure 2:
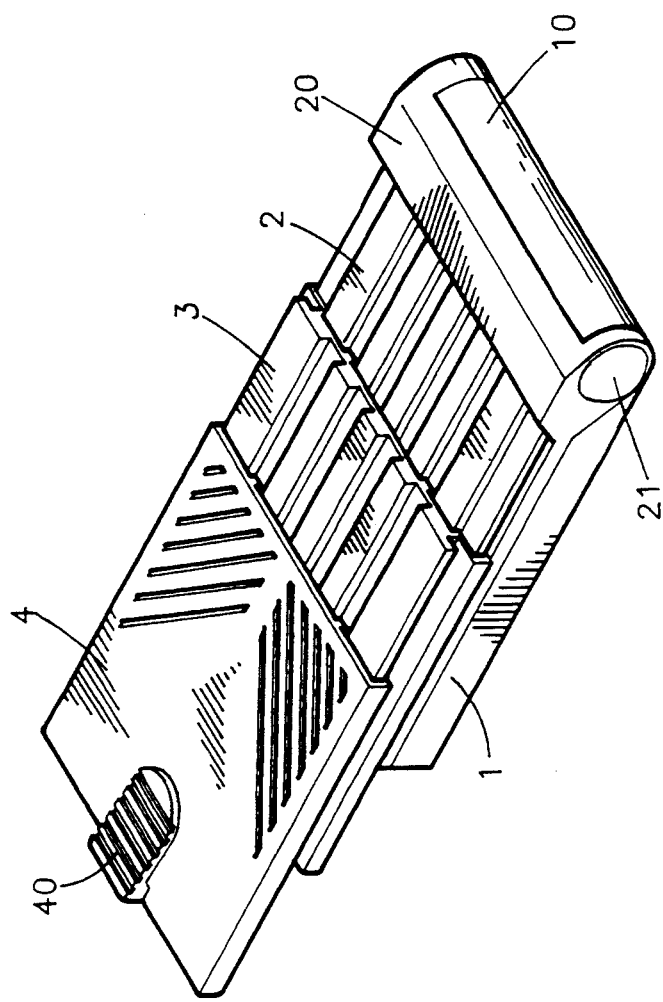
FIG. 2 is an elevational view of the computer disk storage box of FIG. 1.

Referring to FIGS. 1 and 2, a computer disk storage box is accordance with the present invention is generally comprised of a casing 1, a top cover board 2, a first extension board 3, and a second extension board 4. The casing 1 is a rectangular top-open container for keeping computer disks, having a barrel 10 transversely disposed along one short side thereof. The barrel 10 has a corrugated inside surface formed of a series of longitudinal grooves 101. The top cover board 2 covers on the casing 1 at the top, comprising two mounting rings 200 disposed on two opposite ends of a mounting block 20 on one short side thereof and respectively and pivotably fastened to the two opposite ends of the barrel 10 of the casing 1 by two end caps 21, two longitudinal flanges 22 on two opposite long sides thereof, two stop springs 23 spaced on an opposite short side thereof. The mounting rings 200 have a respective pair of inside projections 201 moved to turn the end caps 21. Each end cap 21 comprises two symmetrical projections 212 respectively stopped at the inside projections 201 within either mounting ring 200, and two symmetrical plug rods 210 respectively inserted into either end of the barrel 10. The plug rods 210 have a respective raised portion 211 on an outer side respectively engaged into either longitudinal groove 101 of the barrel 10 for positioning. The first extension board 3 is made to slide on the top cover board 2, comprising two longitudinal slide ways 31 on two opposite long sides thereof at the bottom, which receive the longitudinal flanges 22 of the top cover board 2, two longitudinal flanges 30 outside the longitudinal slide ways 31, two stop blocks 33 spaced on one short side thereof at the bottom corresponding to the stop springs 23 on the top cover board 2, and two stop springs 32 spaced on an opposite short side thereof. The second extension board 3 is made to slide on the first extension board 3, comprising two longitudinal slide ways 41 on two opposite long sides thereof at the bottom, which receive the longitudinal flanges 30 of the first extension board 3, two stop blocks 42 spaced on one short side thereof at the bottom corresponding to the stop springs 32 on the first extension board 3, a clip 40 on an opposite short side thereof in the middle at the top.

Figure 3:
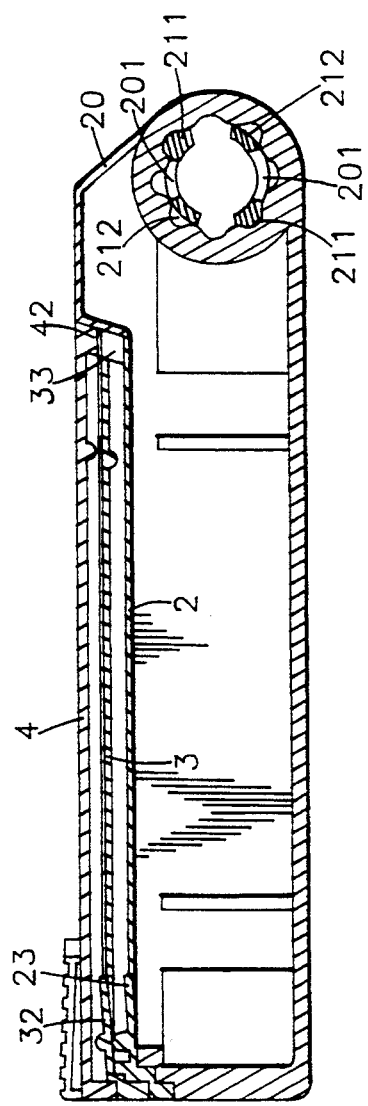
FIG. 3 is a side view in section of the computer disk storage box of FIG. 1 taken in the longitudinal direction.

Referring to FIG. 3 and FIG. 2 again, when assembled, the top cover board 2 can be turned upwards to open the casing 1, or downwards to close the casing 1. As the top cover board 2 is lifted, the inside projections 201 of the mounting rings 200 are simultaneously driven to move the projections 212 of the end caps 21, causing the raised portions 211 of the plug rods 210 to respectively move from one longitudinal groove 101 to another, and therefore the top cover board 2 is immediately retained in in position after it was lifted. The second extension board 4 can be extended out of the first extension board 3, and the first extension board 3 can be extended out of the top cover board 2. When extended out, the stop springs 32;23 are respectively stopped against the stop blocks 42;33 to hold the first and second extension boards 3;4 in the respective extended positions, and therefore the first and second extension boards 3;4 do not disconnect from the top cover board 2.

Figure 4:
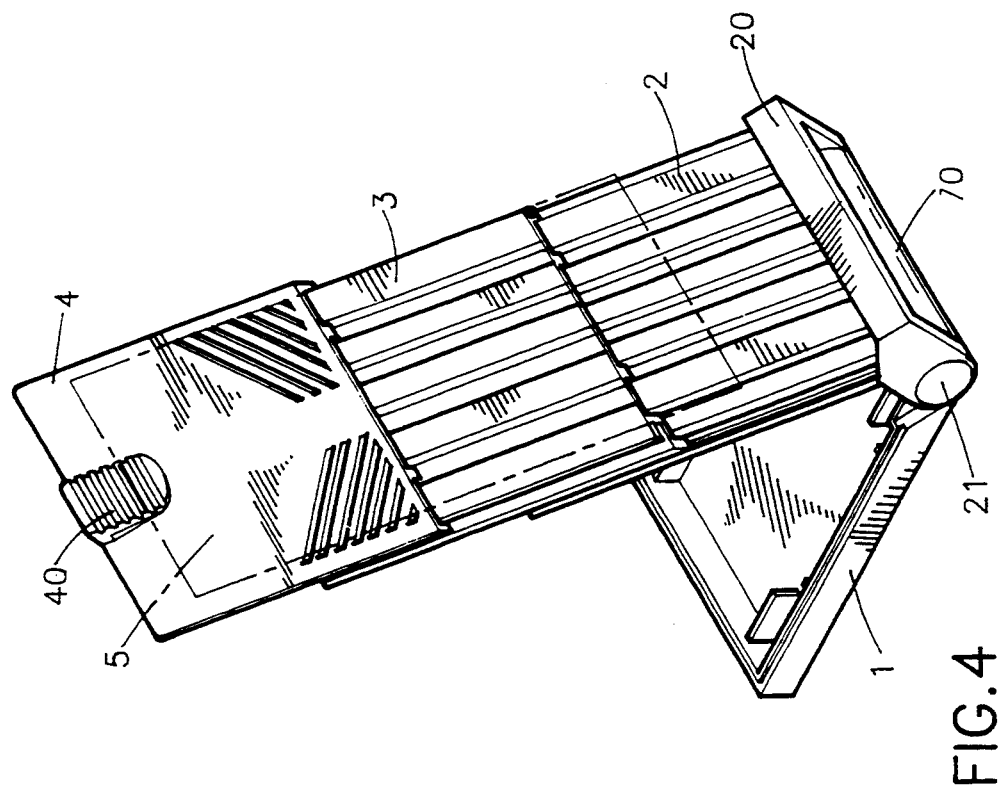
FIG. 4 shows the top cover board and extension boards of the computer disk storage box of FIG. 1 set into the operative mode to serve as a copy holder.

Referring to FIG. 4, the top cover board 2 is lifted from the casing 1 and disposed in a sloping position, add the second and first extension boards 4;3 are extended out of the top cover board 2 and retained in a respective sloping position. Therefore, the second and first extension boards 4;3 and the top cover board 2 form into a copy holder to hold copies 4 by the clip 40.

What is claimed is:

1. A computer disk storage box comprising a rectangular casing having a top opening, a top cover assembly pivotally mounted on an end of said casing wherein said top cover assembly is pivotable between a first position in which it substantially covers and closes said top opening, and a second position in which said top opening is substantially unobstructed by said cover, and means for permitting said top cover assembly to be removably retained of a series of angular positions on said casing between said first and second positions, wherein said top cover assembly is comprised of a top cover board, a first extension board, and a second extension board that slide one within another, said second extension board comprising two longitudinal slide ways on two opposite sides thereof and two stop blocks spaced on a front end thereof, said first extension board comprising two longitudinal side flanges on two opposite sides thereof moved to slide in the longitudinal slide ways of said second extension board, and two stop springs spaced on a rear end thereof which stop against the stop blocks on said second extension board to retain said second extension board to said first extension board in an extended position as said second extension board is extended out of said first extension board, said first extension board further comprising two longitudinal slide ways on the two opposite sides thereof and two stop blocks spaced on a front end thereof, said top cover board comprising two longitudinal side flanges on two opposite sides thereof moved to slide in the longitudinal slide ways of said first extension board, two stop springs spaced on a rear end of the top cover board which stop against the stop blocks on said first extension board to retain said first extension board to said top cover board in an extended position as said first extension board is extended out of said top cover board, and a mounting block on a front end of the top cover board pivotally mounted to said end of said casing by said means.

2. The computer disk storage box of claim 1 wherein said second extension board comprises a unitary clip for holding sheets of paper on said second extension board.

* * * * *